United States Patent [19]
Byrd

[11] Patent Number: 6,021,228
[45] Date of Patent: Feb. 1, 2000

[54] INTEGER-ONLY SHORT-FILTER LENGTH SIGNAL ANALYSIS/SYNTHESIS METHOD AND APPARATUS

[75] Inventor: Marc J. Byrd, Cupertino, Calif.

[73] Assignee: Netscape Communications Corporation, Mountain View, Calif.

[21] Appl. No.: 08/949,936

[22] Filed: Oct. 14, 1997

[51] Int. Cl.[7] ...................................................... G06K 9/00
[52] U.S. Cl. .......................................... 382/240; 382/239
[58] Field of Search ..................................... 382/232, 240, 382/264, 243, 249, 250, 233, 234, 235, 236, 238, 239, 241, 242, 244, 248, 251, 252, 253; 375/265; 714/792, 795; 708/402, 401, 420, 603; 257/214, 215, 231, 232; 348/403; 358/432, 426

[56] References Cited

U.S. PATENT DOCUMENTS

| | | | |
|---|---|---|---|
| 3,748,451 | 7/1973 | Ingwersen | 235/156 |
| 5,168,375 | 12/1992 | Reisch et al. | 358/432 |
| 5,315,670 | 5/1994 | Shapiro | 382/56 |
| 5,483,475 | 1/1996 | Kao | 364/725 |
| 5,508,538 | 4/1996 | Fijany et al. | 257/214 |
| 5,596,517 | 1/1997 | Jones et al. | 364/725 |
| 5,680,507 | 10/1997 | Chen | 395/2.32 |
| 5,682,441 | 10/1997 | Ligtenberg et al. | 382/240 |
| 5,740,281 | 4/1998 | Hirai | 382/243 |
| 5,809,082 | 9/1998 | Xia | 375/265 |
| 5,881,176 | 3/1999 | Keith et al. | 382/248 |

OTHER PUBLICATIONS

Edward H. Adelson, et al. "Subband Image Coding with Three–tap Pyramids," MIT Media Laboratory, Cambridge, Massachusetts, 1990, pp. 1–2, Picture Coding Symposium–1990).

*Primary Examiner*—Bijan Tadayon
*Attorney, Agent, or Firm*—Limbach & Limbach LLP; Seong-Kun Oh

[57] ABSTRACT

A method of signal processing including receiving an input vector for processing, decomposing an input vector of N length including multiplying input vector with a first and a second decimating matrices to generate a shape vector and a detail vector shape vector and detail vector having a length of N/2, where N is an integer, reconstructing input vector including multiplying shape vector and detail vector by a first and second restoring matrices respectively, to generate a reconstructed shape vector and a reconstructed detail vector, and adding reconstructed shape vector to reconstructed detail vector to generate an integer processed input vector is presented. Accordingly, signal processing involves fewer integer operations compared to floating point operations representing more precision for less operations, and further, requires neither the approximation or the computation overhead of the conventional approach.

10 Claims, 3 Drawing Sheets

INTEGER-ONLY SHORT-FILTER LENGTH SIGNAL ANALYSIS/SYNTHESIS METHOD AND APPARATUS

BACKGROUND OF THE INVENTION

1. Field of the Invention

The present invention relates to signal processing, including signal analysis, synthesis, approximation and compression. More particularly, the present invention relates to methods for efficient and precise data compression including image and video data.

2. Description of the Related Art

Wavelets are uniquely suited to analyzing and compactly representing signals by a computer where the signals represent a physical phenomenon such as a video image, audio signal and so on. By efficiently and effectively dividing the signal data into components corresponding to different frequency ranges, near-optimal time-domain information is retained as appropriate to that frequency range (e.g. low frequency signals are by definition not isolated well in time). In contrast, Fourier Transform based signal analysis methods convert all of these frequency ranges into a frequency spectrum, destroying all time-related information. (Time and frequency are general variables, and may, for example, be substituted with distance and spatial-frequency).

Signals that contain a temporally well-isolated high frequency spike or edge are well suited for compact representation through wavelet analysis. By applying successive wavelet decompositions, low frequency signal features may also be compactly represented, leaving large numbers of adjacent coefficients of negligible magnitude. Wavelet analysis thus provides a general purpose approach for compactly representing both low and high frequency features.

For an input signal vector f, wavelet decomposition or more generally, a sub-band decomposition, is achieved by multiplication with two decimating matrices A, B (i.e., matrices that reduce the length of such vectors by half (½)) expressed as follows:

$$c=Af \quad (1)$$

$$d=Bf \quad (2)$$

where vector c is generally referred to as the approximation or "shape" of the original signal, and where vector d is referred to as the error or "detail" signal as it generally provides a critically downsampled vector containing the difference between the original and the shape vectors. If the length of the original vector f is N, then the dimensions of each of the decimating matrices A and B are (N/2×N). Thus, the shape vector c and the detail vector d are each of length N/2.

Reconstruction of the original signal is achieved by multiplying the shape vector c and the detail vector d by two restoring matrices P and Q, which satisfy the following expression:

$$Pc+Qd=f \quad (3)$$

By substituting for the shape vector c and the detail vector d, expression (3) can be reduced to the following equation:

$$PA+QB=1 \quad (4)$$

Where 1 is an identity matrix.

An alternative approach disclosed in E. Adelson & E Simoncelli, *Subband Image coding with Three-tap Pyramids*, Picture Coding Symposium 1990, MIT Media Laboratory, Cambridge. Mass., interleaves both the decimating matrices A, B and the resulting shape and detail vectors c, d. Accordingly, given a decomposition vector p, the following expression is achieved for the reconstruction of the original vector f:

$$f=Fp \quad (5)$$

where matrix F is an interleaved combination of matrices A and B, and the decomposition vector p is the corresponding interleaved combination of the shape and detail vectors c, d. According to the Adelson & Simoncelli approach, the interleaved combination matrix F is selected such that the following vector filters a, b alternate in the columns with offsets that place them on the diagonal of the matrix:

$$a=[1\ 2\ 1]$$

$$b=[0\text{-}1\ 2\text{-}1] \quad (6)$$

It is to be appreciated that these filters a and b are orthogonal such that there is no overlap or redundancy in the resulting shape vector c and the detail vector d.

According to the Adelson & Simoncelli approach, a reconstructing matrix G is determined by a simple inversion of the system as illustrated by the following expressions.

$$GF=1 \quad (7)$$

which can be alternatively expressed as:

$$G=F^{-1} \quad (8)$$

where the values for the reconstruction matrix G can be determined for the various filter lengths. Referring back to Equation (5), the decomposition vector p can be alternatively be expressed as follows:

$$p=F^{-1}f \quad (9)$$

One drawback to this approach is that the reconstruction vector G, which, according to equation (8), is the inverse of the interleaved combination matrix F, is generally not sparse; that is, it is dense with non-zero coefficients which also generally require floating point representation in a computer. Floating point operations, in general, may take twice as long for a computer to perform as compared to integer operations. Furthermore, where floating point operations are used, either additional processing by the computer is necessary to convert to integer, and thus requires further processing cycles of the computer and the addition of more noise, or alternatively, a separate, larger array must be created to store the results of the decomposition process in floating point form because the floating point numbers require more bits in storage.

The Adelson & Simoncelli approach approximates the reconstruction matrix G with between 15 to 21 non-zero coefficients along the diagonal represented in floating point precision. The drawbacks to this approach are its use of 1) floating point as opposed to integers, 2) approximation, and therefore, loss of precision compared to a more precise and controlled approximation, and 3) the need for 15 to 21 coefficients rather than 3 coefficients since, for efficient and precise operations, three integer computations is much more desirable than 15 to 21 floating point operations.

Digital Data Compression System Including Zerotree Coefficient Coding, U.S. Pat. No. 5,315,670 to Shapiro discloses a conventional image compression technique where the results of the decomposition pass are floating point coefficients. In such a case, however, if the floating point coefficients are used in completing the compression, a very large number of floating point compares and adds are required. For example, the number of compares and adds/ subtracts in the Shapiro method is on the order of 1 per bit. Threrefore, given a 24-bit color image of 512×512 pixels, the Shapiro method would require over 6 million compares and adds. Furthermore, the precision of the coefficients in Shapiro is significantly compromised by approximating the coefficients as integers. While the Shapiro approach may be adequate in some cases, its inherent encoding benefit where successive refinements from the coefficients are used to reproduce the original sub-band coefficient matrix precisely is lost. Moreover, even this approach requires some large number of floating point conversions.

SUMMARY OF THE INVENTION

In view of the foregoing, the methods of data compression in accordance with the present invention employs integer coefficients, and therefore, requires neither the approximation nor the computational overhead of the many conventional approaches. In particular, in accordance with the present invention, fewer integer operations are used as compared to greater floating point operations, therefore, more precision can be represented with fewer computational operation stages.

Accordingly, a method of processing a signal optimized for computational efficiency and precision in accordance with one embodiment of the present invention includes the steps of receiving an input vector of N length where N is an integer for processing; decomposing said input vector, said decomposing step including multiplying said input vector with a first and a second decimating matrices each decimating matrix comprising a plurality of integers matrix values, to generate a shape vector and a detail vector respectively, said first and second decimating matrices being dimensioned such that said shape vector and said detail vector each have a length of N/2; reconstructing said input vector, said step of reconstructing including multiplying said shape vector and said detail vector by a first and a second restoring matrix respectively, to generate a reconstructed shape vector and a reconstructed detail vector; and adding said reconstructed shape vector to said reconstructed detail vector to generate an integer processed input vector.

The step of receiving said input vector for processing in accordance with another embodiment of the present invention includes first preparation processing a first portion of said input vector; forward differencing processing a second portion of said input vector to generate forward differencing processed input vector, wherein said first and second portions of said input vector are non-overlapping; second preparation processing a first portion of said forward differencing processed input vector; and backward differencing processing a second portion of said forward differencing processed input vector to generate an approximate input vector, wherein said first and second portions of said forward differencing processed input vector are non-overlapping and further, wherein said input vector at said reconstruction step is said approximate input vector.

In accordance with yet another embodiment of the present invention, the first and second decimating matrices are vector filters of length [1 2 1] and [0-1 2-1], respectively. Furthermore, in accordance with yet another embodiment of the present invention, the step of decomposing said input vector includes performing Cholesky decomposition on a square matrix of a predetermined size said square matrix being the sum of said first and second decimating matrices multiplied by its respective transpose. Accordingly, in accordance with another embodiment of the present invention, the square matrix includes [1 4 1]/6 along its diagonal.

An apparatus for optimizing signal processing for computational efficiency and precision, in accordance with yet another embodiment of the present invention includes decomposition processing means for multiplying an input vector with a first and a second decimating matrices, each decimating matrix comprising a plurality of integer matrix values to generate a shape vector and a detail vector respectively, said first and second decimating matrices being dimensioned such that said shape vector and said detail vector each have a length of N/2; reconstruction processing mean for multiplying said shape vector and said detail vector from said decomposition means by a first and a second restoring matrix respectively, to generate a reconstructed shape vector and a reconstructed detail vector; and means for adding said reconstructed shape vector to said reconstructed detail vector to generate an integer processed input vector.

In accordance with yet another embodiment of the present invention, decomposition processing means further comprises: first preparation processing means for preparation processing a first portion of said input vector; forward differencing processing means for forward differencing processing a second portion of said input vector to generate forward differencing processed input vector, wherein said first and second portions of said input vector are non-overlapping; second preparation processing means for preparation processing a first portion of said forward differencing processed input vector; and backward differencing processing means for backward differencing processing a second portion of said forward differencing processed input vector to generate an approximate input vector, wherein said first and second portions of said forward differencing processed input vector are nonoverlapping.

These and other features and advantages of the present invention will be understood upon consideration of the following detailed description of the invention and the accompanying drawings.

DETAILED DESCRIPTION OF THE INVENTION

Figure 1:
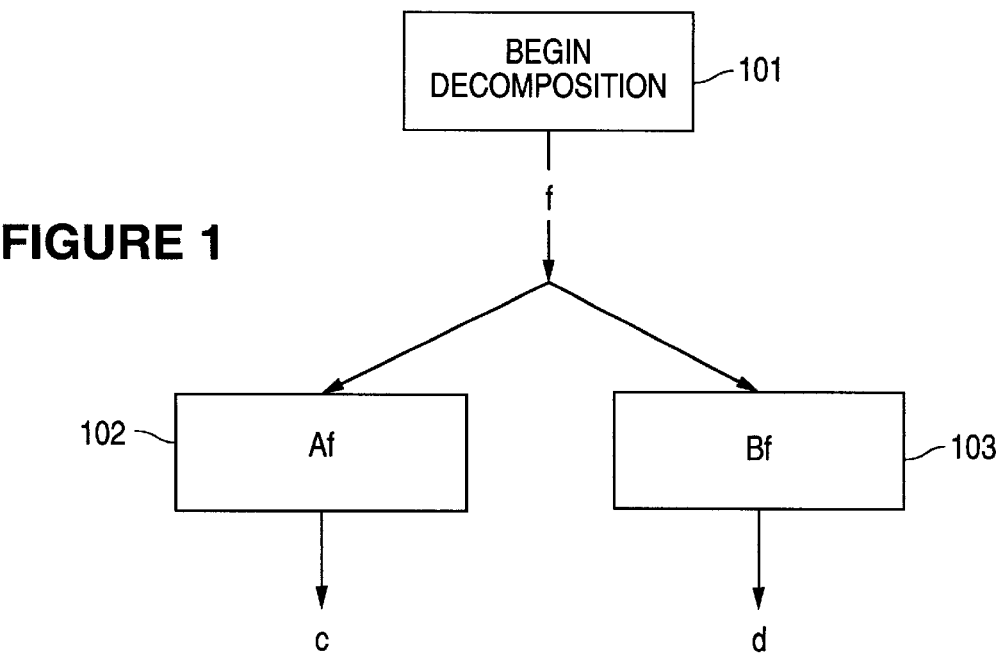
FIG. 1 is a flowchart of a decomposition stage in accordance with one embodiment of the present invention.

FIG. 1 is a flowchart of a decomposition stage in accordance with one embodiment of the present invention. As shown, when the decomposition of the input vector f begins at step 101, it is decomposed by multiplying the input vector f by two decimating matrices A and B at steps 102 and 103 respectively, such that a shape vector c and a detail vector d respectively, are obtained. The shape vector c and the detail vector d, by way of the decimating matrices A, B have vector lengths that are individually half that of the original input vector f. That the shape and detail vectors c, d respectively, are half in length as compared to the original input vector f allows for "in-place" processing, which saves memory, and further, which is not compatible with floating point operation results of an integer input. In other words, the results of the decomposition process can be placed into a memory location addressable by a computer for representing the input vector f.

That the results of the decomposition process can be placed into the memory representing the input vector f permits reduction in memory requirements of the system and broadens the number of compatible computing platforms and environments with the signal processing system in accordance with the present invention.

Figure 2:
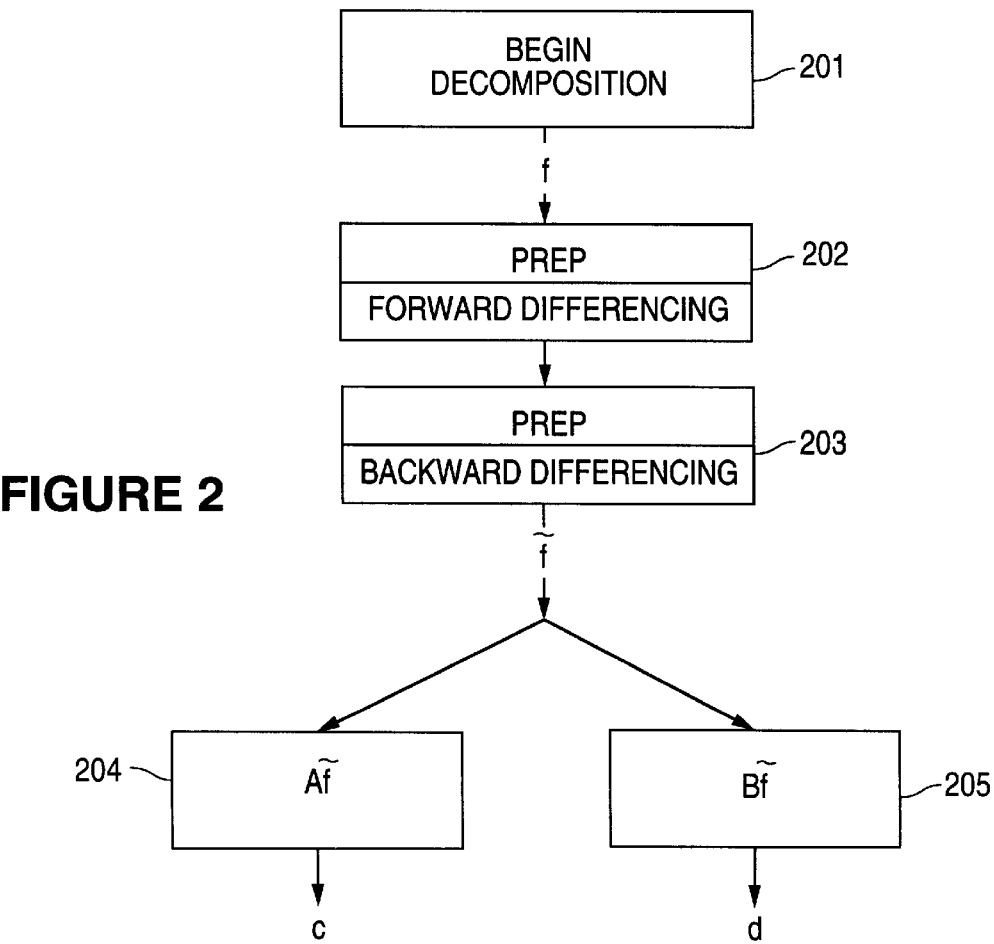
FIG. 2 is a flowchart of a decomposition stage in accordance with another embodiment of the present invention.

FIG. 2 is a flowchart of a decomposition stage in accordance with another embodiment of the present invention. As compared with the decomposition stage illustrated in FIG. 1, the multiplication by the two decimating matrices A, B at steps 204 and 205 respectively, correlate with the multiplication by the two decimating matrices A, B at steps 102 and 103 respectively, of FIG. 1. However, in the embodiment of FIG. 2, the decimating matrices A, B are multiplied at steps 204 and 205 respectively, with an approximation of the input vector f~ which is generated at the previous stages 202 and 203 by way of forward and backward differencing, respectively. In particular, after the decomposition is commenced (step 201), the input vector f is prepared and then, a forward differencing process is applied at step 202.

In accordance with one embodiment of the present invention, at step 201, a plurality of variables are initialized as follows:

define ALPHA (0.85355339060)
define BETA (0.14644660941)
define BETA_ALPHA (0.17157287525)
define ALPHA_SQR (0.72855339059)
define BIG_INT 65536
static int P_BIG_IN2=int(BIG_INT/2);
static int P_ALPHA=int(BIG_INT*ALPHA);
static int P_BETA_ALPHA=int(BIG_INT*BETA_ALPHA);
static int P_ALPHA_SQR=int(BIG_INT/ALPHA_SQR).

Then, as a part of step 202, the input vector f is prepared for forward differencing processing as follows, where the division by BIG_INT is preferably performed by a bit shift when bit shift operation is permissible by the system.

xp[0]=(x[0]*P_ALPHA+P_BIG_INT2)/BIG_INT;
xp[1]=(x[1]*P_ALPHA+P_BIG_INT2)/BIG_INT;
xp[1]=xp[1]+0.2*(xp[1]-xp[0]).

After preparing the input vector f for forward differencing processing, again, as part of step 202, forward differencing processing in an iterative loop is performed as follows:

for (i=0;i<n-2;i++){ xp[i+2]=x[i+2]-((P_BETA_ALPHA*xp[i]+P_BIG_INT2)/BIG_INT);

}.

After the input vector f is forward differencing processed at step 202, it is again prepared and then, a backward differencing process is applied at step 203 and the result is thereafter normalized. In particular, the preparation step, as part of step 203, for backward differencing process is performed as follows:

x[n-1]=(xp[n-1]*P_ALPHA+P_BIG_INT2)/BIG_INT;
x[n-2]=(xp[n-2]*P_ALPHA+P_BIG_INT2)/BIG_INT;
x[n-3]=(xp[n-3]*P_ALPHA+P_BIG_INT2)/BIG_INT;
x[n-1]=x[n-1]-1.42*(x[n-2]-x[n-1]);
x[n-2]=x[n-2]+0.42*(x[n-3]-x[n-2]).

Then, the backward differencing process in an iterative loop is applied at step 203 to the result of the preparation as follows:

for (i=n-1;i>1;i--){ x[i-2]=((xp[i-2]-(P_BETA_ALPHA*x[i]+P_BIG_INT2)/BIG_INT))

}.

x[0]=x[0]-0.05*(x[0]-x[1]).

Thereafter, a normalization process is applied to the result of the backward differencing process as follows:

for (i=0;i<n;i++){ x[i]=(x[i]*P_ALPHA_SQR+P_BIG_INT2)/BIG_INT;

}

Figure 5:
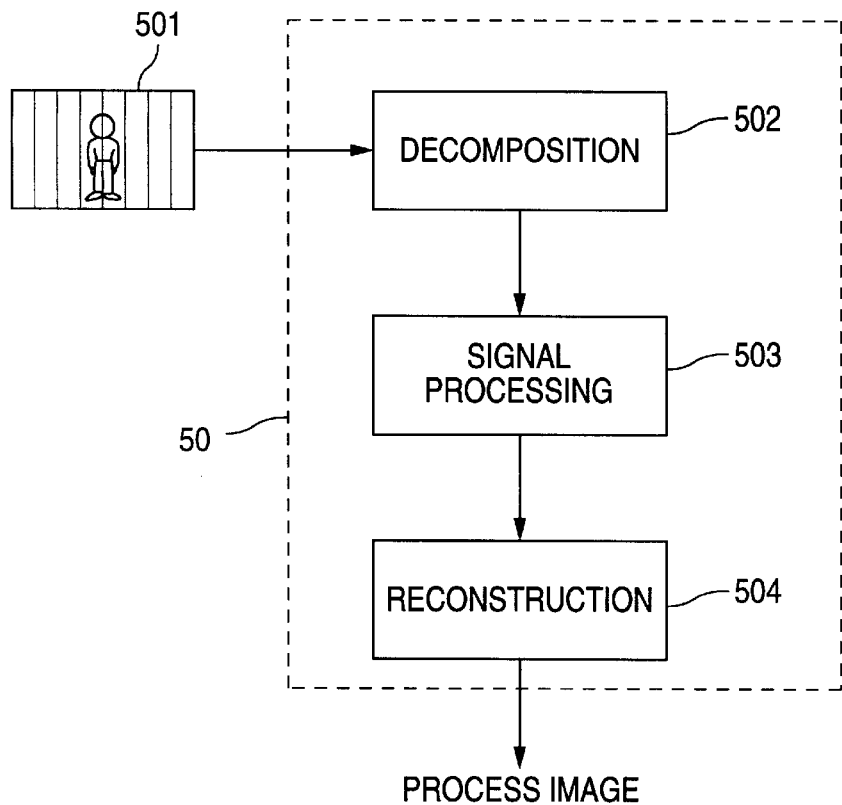
FIG. 5 is a block diagram illustrating one embodiment of the present invention.

To optimize the decomposition stage, the decomposition of the j-th column of the input signal in the form of a 2-dimensional matrix coefficient (for example, as in a still image or a single frame of video, as shown in FIG. 5) is performed in a modified fashion as follows:

for (i=0;i<nx; i++)in_line[i]=coeff[i][j];

Reflection(in_line,in_line + nx -1);

for (i=0,t = in_line; i<mx; i++){ coeff[i ][j] = t[0]+((t[1]+t[-1])>>1);

t++;

coeff[i+mx][j]=t[0]-((t[1]+ t[-1])>>1);

t++;

} where the Reflection(in_line, in_line+nx-1) step above adds array elements at the beginning and the end to reflect end coefficients. Alternatively, in accordance with one embodiment of the present invention, the normalization process as described above can be combined with the backward differencing process. Moreover, the shape and detail vectors c, d can be obtained by way of downsampling the approximated input vector f~ received from step 203 by a factor of 2 and then convolving with respective predetermined filters. The filters have the same characteristics as the decimating matrices A and B which, as previously stated, comprise column kernels [1 2 1] and [0-1 2-1], respectively.

Accordingly, in accordance with one embodiment of the present invention, with decimating matrices A and B made up of the column kernels [1 2 1] and [0-1 2-1], an approximating system that uses only these integer, short length filters within normalization of four (which is preferably very efficiently implemented as a bit shift) is given by the following expression:

$$A^tA+B^tB=H \quad (10)$$

where $A^t$ and $B^t$ are transposes of the decimating matrices A, B, and further, where the resulting square matrix H contains the vector [1 4 1]/6 along its diagonal, and in some cases may be approximated as a unity vector 1. Under this condition of approximating the square matrix H by unity, the resulting filters have short, integer values.

To obtain resulting filters capable of precise reconstruction, both sides of equation (10) are pre-multiplied by the inverse of the square matrix H. However, the inverse of the square matrix H is neither short in length (i.e., it is not sparse), nor is it integer based. Therefore, to re-attain the filter characteristics of short and integer values, it is first determined that the square matrix H is a tri-diagonal containing [1 4 1] along its diagonal. Such a matrix can be represented as the product of an upper diagonal matrix Hc and the transpose thereof $H^tc$, a lower diagonal matrix as shown by the following expression.

$$H=H_c^tH_c \quad (11)$$

where $H_c$ is known as Cholesky decomposition of the square matrix H.

For a symmetric and positive definite square matrix A, it has a special, more efficient triangular decomposition. Symmetry here means that the values of the coefficients of a vector are $a_{ij}=a_{ji}$ for i,j=1, . . . ,N, while positive definite means that $v \cdot A \cdot v > 0$ for all vectors v. With the foregoing, a special factorization of the symmetric, positive definite matrix is called Cholesky decomposition.

Next, an approximate vector f~ based on the input vector f that precisely satisfies the following expression is determined:

$$f=(A^tA+B^tB)f\sim \quad (12)$$

such that decomposition and reconstruction of the approximation vector f~ reproduces the original input vector f Substituting equations (10) and (11) into equation (12) results in the following expression:

$$f=H_c^tH_cf\sim \quad (13)$$

which may further be expressed as two equations involving a temporary vector y:

$$f=H_c^ty \quad (14)$$

$$y=H_cf \quad (15)$$

Given the upper and lower diagonal properties of the Cholesky decomposition $H_c$ and its transpose $H_c^t$, the temporary vector y and the input vector f can be determined by backward and forward differencing processings.

As previously discussed, in accordance with one embodiment of the present invention, the decomposition and the reconstruction of the input vector f including backward and forward differencing is implemented as follows:

```
#define ALPHA      (0.85355339060)
#define BETA       (0.14644660941)
#define BETA_ALPHA (0.17157287525)
#define ALPHA_SQR  (0.72855339059)

#define BIG_INT 65536
static int P_BIG_INT2  = int(BIG_INT/2);
static int P_ALPHA     = int(BIG_INT*ALPHA);
static int P_BETA_ALPHA= int(BIG_INT*BETA_ALPHA);
static int P_ALPHA_SQR = int(BIG_INT/ALPHA_SQR);

void PreProcess(Pel_Type*x, int n){
int i;
Pel_Type xp[1024];

// First forward differencing:
xp[0]=(x[0]*P_ALPHA+P_BIG_INT2)/BIG_INT;
xp[1]=(x[1]*P_ALPHA+P_BIG_INT2)/BIG_INT;
xp[1] = xp[1] + 0.2*(xp[1]-xp[0]);
for (i = 0;i<n-2;i++){
xp[i+2]= x[i+2]-((P_BETA_ALPHA*xp[i]+P_BIG_INT2)/BIG_INT)
}
```

-continued

```
// Now backward, w/normalization:

x[n-1] = (xp[n-1]*P_ALPHA+P_BIG_INT2)/BIG_INT;

x[n-2] = (xp[n-2]*P_ALPHA+P_BIG_INT2)/BIG_INT;

x[n-3] = (xp[n-3]*P_ALPHA+P_BIG_INT2)/BIG_INT;

x[n-1] = x[n-1] - 1.42*(x[n-2]-x[n-1]);

x[n-2] = x[n-2] + 0.42*(x[n-3]-x[n-2]);

for (i=n-1;i>1;i--){ x[i-2] = ((xp[i-2]- (P_BETA_ALPHA*x[i]+P_BIG_INT2)/BIG_int));

} x[0] = x[0] - 0.05*(x[0] - x[1]);

for (i=0;i<n;i++){ x[i] = (x[i]*P_ALPHA_SQR+P_BIG_INT2)/BIG_INT;

}

}
```

Furthermore, the relationship between the input vector f and the approximate vector f~ as shown in equation (12) can be alternatively be represented as follows:

$$f = \beta \cdot h_c^t h_c \tilde{f} \qquad (16)$$

where the matrix $h_c$ generally contains "1" on the diagonal and a filter variable $\alpha$ on the single off-diagonal element which, in the case of these [1 2 1] filters is 0.14644660941, while a constant $\beta$ is the normalization constant.

Accordingly, a script which generates the square matrix H, performs Cholesky decomposition followed by normalization is illustrated below:

```
function H = genH(M):

H  = sparse(M,M);

H(1,1:2)=[4 1];

H(M,M-1:M) = [1 4];

h  = [1 4 1];            /* Result 1 */ for i=2:M-1,

H(i,i-1:i+1) = h;        /* Result 2 */ end;

full(H(1:5,1:5))

full(H(M-5:M,M-5:M))

Hc = chol(H);            /* Result 3 */ full(Hc(1:5,1:5))

full(Hc(M-5:M,M-5:M))

β = Hc(M-3, M-3)

Hcn = Hc/β;              /* Result 4 */
```

-continued

```
    full(Hcn(1:5,1:5))
    full(Hcn(M-5:M,M-5:M))

α = Hcn(M-3,M-2)
```

Accordingly, the following results are obtained as the output from the Cholesky decomposition:

```
>> genH(32);
ans=   Result 1
       4          1          0          0          0
       1          4          1          0          0
       0          1          4          1          0
       0          0          1          4          1
       0          0          0          1          4
ans=   Result 2
       2.0000     0.5000     0          0          0
       0          1.9365     0.5164     0          0
       0          0          1.9322     0.5175     0
       0          0          0          1.9319     0.5176
       0          0          0          0          1.9319
ans=   Result 3
       1.9319     0.5176     0          0          0          0
       0          1.9319     0.5176     0          0          0
       0          0          4.9319     0.5176     0          0
       0          0          0          1.9319     0.5176     0
       0          0          0          0          1.9319     0.5176
       0          0          0          0          0          1.9319
β=     1.9319
ans=   Result 4
       1.0353     0.2588     0          0          0
       0          1.0624     0.2673     0          0
       0          0          1.0002     0.2679     0
       0          0          0          1.0000     0.2679
       0          0          0          0          1.0000
```

-continued

```
ans=
    1.0000   0.2679   0        0        0        0
    0        1.0000   0.2679   0        0        0
    0        0        1.0000   0.2679   0        0
    0        0        0        1.0000   0.2679   0
    0        0        0        0        1.0000   0.2679
    0        0        0        0        0        1.0000
α=  0.2679
```

As can be seen from the above, the normalization is performed by first determining the normalization constant β and then dividing the Cholesky decomposition Hc by the normalization constant β to obtain the normalized Cholesky decomposition Hcn with mostly one along the diagonals and the filter variable α along the off-diagonals. Moreover, it can be seen that due to the values of the first few coefficients in the top left of the matrix that vary slightly from the value of the filter variable α, the pre-forward/backward differencings preparation processes are performed.

The magnitude of the filter variable α compared to unity indicates a fairly stable system for backward and forward differencing, and approximations or errors introduced at this stage of process generally remain localized at this stage. Therefore, a single floating point multiplication with the filter variable α is required for each coefficient in the backward direction, and single floating point multiplication operation combining the normalization constant β and the filter variable a in the forward direction, yielding a total of two (2) floating point multiplication and two (2) floating point adds for each element of the input vector f, while providing precise reconstruction, and therefore obtaining a system with short filters without approximation.

Finally, to obtain integer only performance of the filters, integer representation of the filter variable a and the normalization constant β are used. In particular, a 16-bit arithmetic and an under-approximation of the filter variable α are used to obtain values of data which are substantially precise to provide precise reconstruction of 8-bit data.

Therefore, in accordance with the present invention, integer operation of quantization and encoding systems for compression without sacrificing precision at the analysis or decomposition stage is be achieved.

Figure 3:
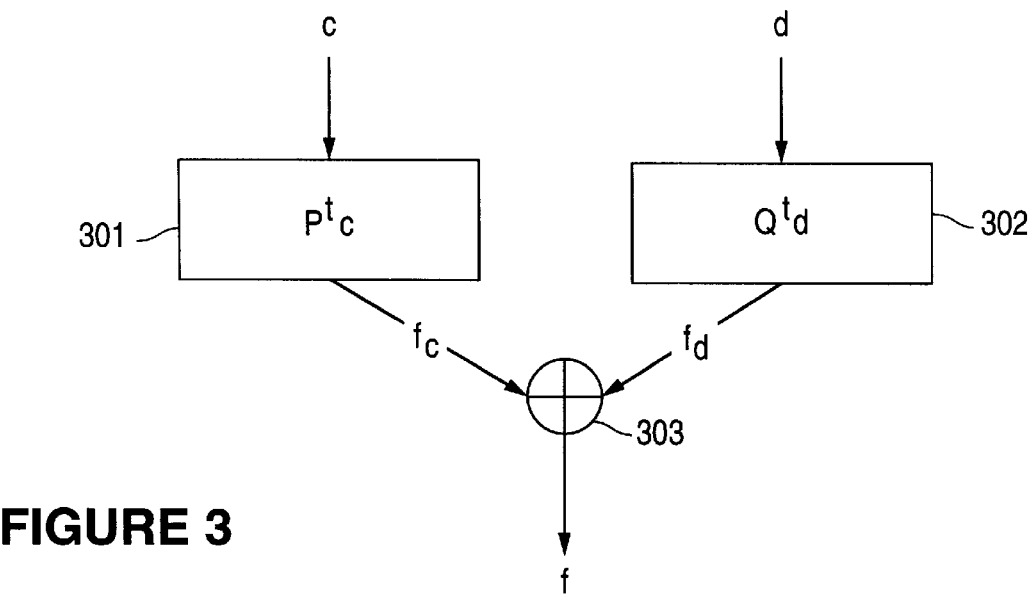
FIG. 3 is a flowchart of a reconstruction stage in accordance with one embodiment of the present invention.

FIG. 3 is a flowchart of a reconstruction stage in accordance with one embodiment of the present invention. As shown, the shape vector c and the detail vector d from the reconstruction stage are received and respectively processed at steps 301 and 302 to generate a reconstructed shape vector $f_c$ and a reconstructed detail vector $f_d$ by multiplying the shape vector c and the detail vector d at steps 301 and 302 respectively, by the transpose of restoring matrices $P^t$ and $Q^t$ respectively. Then, the reconstructed shape vector $f_c$ and the reconstructed detail vector $f_d$ are added by an adder 303 to generate the input vector f.

As with the case of the decomposition processing, reconstruction of the column j of the two-dimensional matrix coefficients is achieved with the following including a simple reflection boundary treatment:

```
for (i = 0, t = in_line; i < mx; i++){
    *(t++) = coeff[i][j];
    *(t++) = coeff[i+mx][j];
}
``` dReflection(in_line,in_line + nx - 1);

```
for (i = 0, t = in_line; i < nx;i=i+2){
    coeff[i][j] = ((t[i+0])>>1) - ((t[i+1] + t[i-1]) >> 2);
    coeff[i+1][j] = ((t[i+1])>>1) - ((t[i+2] + t[i-0]) >> 2);
}
``` where dReflection(in_line, in_line+nx−1) indicates slightly different process for optimizing the reconstruction stage.

In the manner described manner, an input data can be efficiently compressed using only integers, thereby substantially simplifying the data compression process with higher precision. Therefore, it is possible to perform any iterative refinement quantization (for example, as those indicated by Shapiro) in an integer domain, and therefore, the quantization can be performed more computationally efficiently as compared to quantization operations in a floating point domain. As discussed above, in accordance with the present invention, there is provided a decomposition processing followed by a successive refinement quantization, and therefore, resulting in a decomposition process that results in a non-approximated integer representation which offers added benefits in downline processing.

Alternatively, instead of multiplying the shape and detail vectors c, d respectively, at steps 301 and 302 in the embodiment shown in FIG. 3, in accordance with the present invention, the shape and detail vectors c, d respectively, can be upsampled by a factor of 2 and then convolved with respective predetermined filters. In accordance with one embodiment of the present invention, the filters have the same characteristics as the decimating matrices A and B which, as previously stated, comprise column kernels [1 2 1] and [0-1 2-1], respectively.

Figure 4:
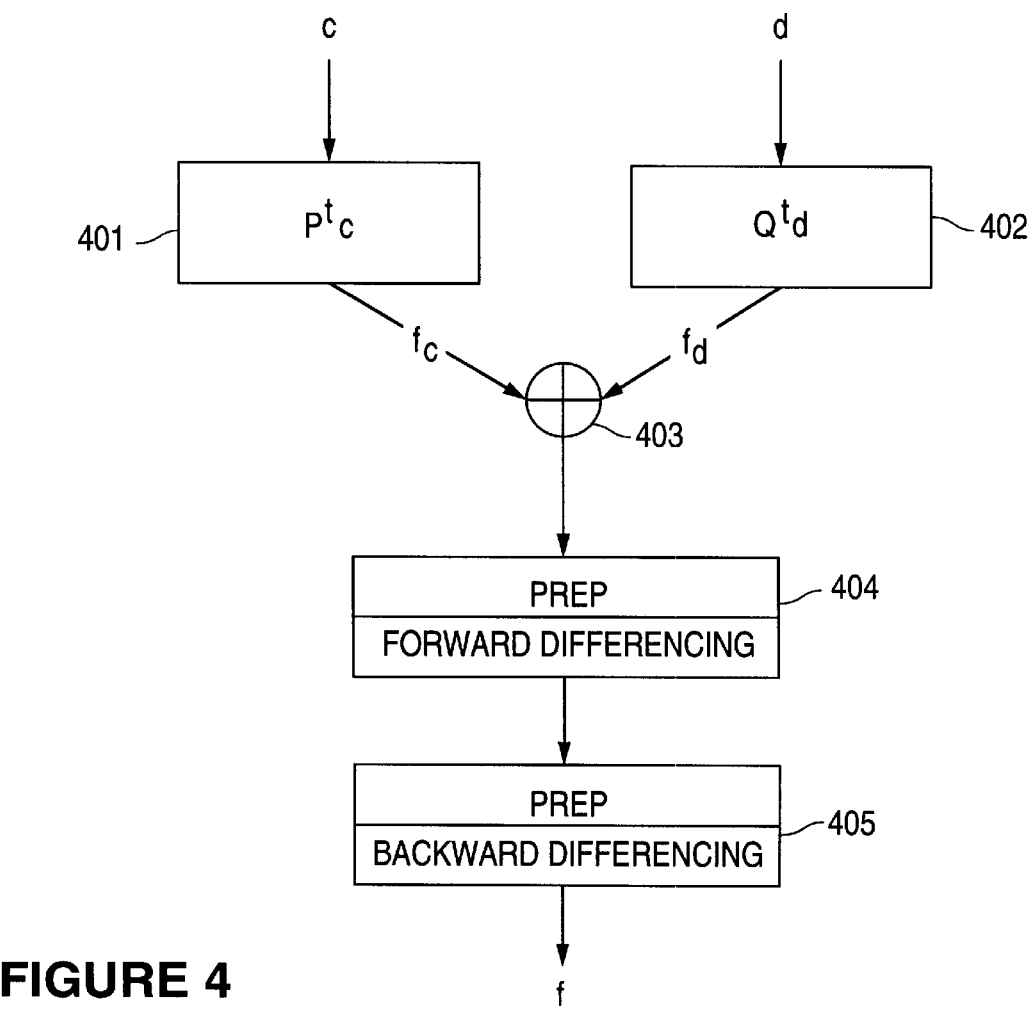
FIG. 4 is a flow chart of a reconstruction stage in accordance with another embodiment of the present invention.

FIG. 4 is a flowchart of the reconstruction stage in accordance with another embodiment of the present invention. As shown, the multiplication steps 401 and 402 as well as the summing step 403 is the same as the steps 301, 302, and 303, respectively of FIG. 3. However, FIG. 4 includes additional differencing steps 404 and 405 as compared with the embodiment shown in FIG. 3. In particular, in accordance with this embodiment of the present invention, the summed input vector f received from the adder 403 is first prepared, and then, forward differencing process is applied thereto at step 404. In turn, the forward differencing processed input vector f is then prepared again at step 405 and backward differencing process is applied to the forward differencing processed input vector f from step 404. In this manner, a processed input vector f is reconstructed using only integer operations thereby reducing the number of necessary operations and enhancing the precision in data compression. In this manner, the backward and forward differencing steps sharpen the high frequency edges (which is the opposite of convolving the vector [1 4 1]/6, which would be slightly smoothing).

In order to obtain precise reconstruction, both sides of the expression (10) are either pre or post-multiplied by the inverse of the square matrix H. Since the inverse of square matrix H is neither short in length (i.e., it is not sparse), nor is it integer based, pre-processing with the square matrix H may be optionally skipped for improved performance at the cost of a smoother approximation of the input vector f as if the input vector f were convolved with a filter of [1 4 1]/6. Again, this smoothing is minor, and may not be objectionable for some situations such as the highest frequency of image information. However, it may be used only for lateral processing as the high frequency content of that information is generally more distinguishable for the human visual perception. It may be only applied at lower frequencies of a multi-level wavelet decomposition since these errors in these frequencies are more visible than errors at higher frequencies.

Pre-multiplication by the inverse of the square matrix H yields a better result since in the context of an approximation in the decomposed domain (such as compression), the post-multiplication would be applied to an approximation, while the pre-multiplication would be precise. Moreover, given the stable nature of the inverse of the square matrix H, it may optionally be applied at the reconstruction phase, i.e., post-processing. This may be useful for load-balancing, for example, in video conferencing.

Figure 5A:
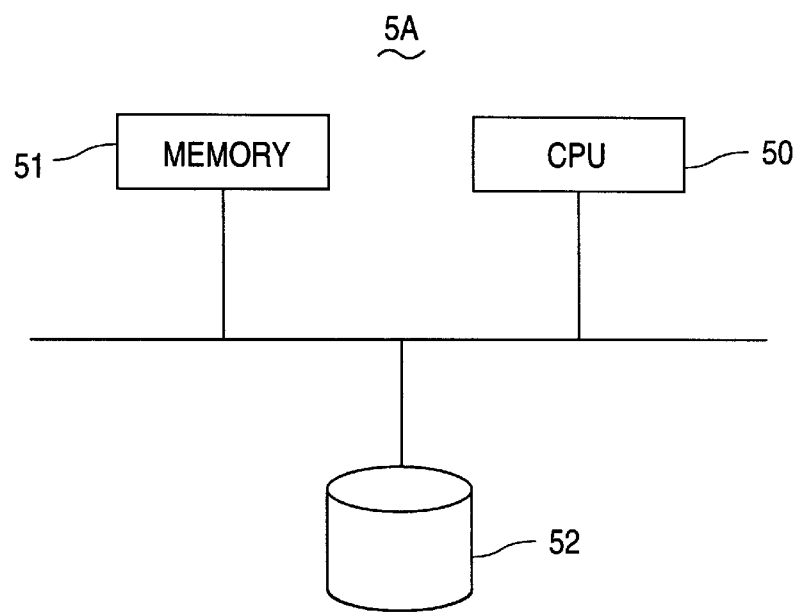
FIG. 5A is a block diagram further illustrating an embodiment of the present invention.

FIG. 5 illustrates a block diagram of a system for processing a signal optimized for computational efficiency and precision in accordance with one embodiment of the present invention. As shown, an input signal 501 such as a video image for example, is provided to a decomposition processor 502 where decomposition processing steps such as those described above in conjunction with FIGS. 1 and 2 are performed. The decomposition processed signal from the decomposition processor 502 is thereafter provided to a signal processor 503 for signal processing which may be a conventional type signal processing. Upon signal processing by the signal processor 503, the signal is then provided to the reconstruction processor 504 where reconstruction processing steps as described above are performed. As can be seen from FIG. 5, the decomposition processor 502, the signal processor 503, and the reconstruction processor 504 can comprise a central processing unit 50 of FIG. 5A. It can be further seen that the CPU 50 is coupled to a memory 51 and a storage device 52 such that the CPU 50 can control storage and/or retrieval of the signal during the processing stages in accordance with the present invention.

The signal decomposition and reconstruction system described herein can be used as the transform component in an image, audio, and/or video-compression system or some other data compression system. For example, for a still image (as opposed to motion for video images), the process is generally applied as follows. First, the following is applied to each scan line (horizontal, row): perform in-place (i.e., placing the result in the vector that was processed) resulting in an approximation on the left and the details dropped in that approximation on the right. Then, the processed vectors are replaced with the result from the previous step at each column (vertical) of the result. Upon processing all of the columns in the vector matrix, a 4-tile representation results. The top left is a ¼-size approximation of the original image. The tile immediately to its right are the vertical edges, while the tile below the approximation (low-frequency part, shape) is the horizontal edges. The final tile (lower right) is the residue or corner details required to fully and accurately reconstruct the image. The procedure is then iteratively applied to each resulting ¼-size approximation, resulting in a series of smaller and smaller approximations and the details needed to reconstruct each pass. This processing can efficiently be represented as a quad-tree data structure and successively approximated by methods such as that disclosed in Adelson & Shapiro. Finally, similar procedures are applied to each RGB color plane, or more commonly, to some YUV representation.

For a video signal, the most simple approach is to treat each frame of the video as a still image. Further variations involve differencing the frames and using the previous frame as a reference for reconstruction (known as Inter-frame compression). Still other variations might involve decomposition (as described herein) along the time axis, and a 3-dimensional tree representation and subsequent iterative refinement. On the other hand, for audio signals, the decomposition may be performed in frames of 1024 samples (1-dimensional), the i-th multiple iterations performed on the lower frequency result of the previous pass. This decomposition and the resulting frequency band representation can be used as the input into a compression system such as MPEG-2 Audio.

In view of the foregoing, according to the present invention, there are provided methods and apparatus for data compression including integer-only, short filter length analysis and synthesis. Given the short integer-only nature of the decomposition and reconstruction kernels, the present invention is uniquely suited to video conferencing where both the sending and receiving ends must operate in real time. Furthermore, in accordance with the present invention, an optional processing step before or after the processings disclosed above may be applied for improved accuracy. A method is described for determining the coefficients associated with this extra processing step by Cholesky decomposition of the correction matrix which is the impulse response of the uncorrected system. Additionally, application of these coefficients in a backward and forward differencing method is described. Other image and video compression systems could likewise benefit from this. Finally, the present invention is uniquely suited to make use of computer processors that are optimized to implement many integer operations in parallel, such as the Intel Pentium MMX.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of processing a signal for a data compression system, said method comprising the steps of:

receiving an input vector of N length by an input means of said system where N is an integer for processing;

decomposing said input vector, said decomposing step including multiplying said input vector with a first and a second decimating matrices each decimating matrix comprising a plurality of integer matrix values, to generate a shape vector and a detail vector respectively, said first and second decimating matrices being dimensioned such that said shape vector and said detail vector each have a length of N/2;

reconstructing said input vector, said step of reconstructing including multiplying said shape vector and said detail vector by a first and a second restoring matrix respectively, to generate a reconstructed shape vector and a reconstructed detail vector;

adding said reconstructed shape vector to said reconstructed detail vector to generate an integer processed input vector; and outputting compressed data using said integer processed input vector.

2. The method of claim 1 wherein said step of receiving said input vector for processing includes the steps of:

first preparation processing a first portion of said input vector;

forward differencing processing a second portion of said input vector to generate forward differencing processed input vector, wherein said first and second portions of said input vector are non-overlapping;

second preparation processing a first portion of said forward differencing processed input vector; and backward differencing processing a second portion of said forward differencing processed input vector to generate an approximate input vector, wherein said first and second portions of said forward differencing processed input vector are nonoverlapping and further, wherein said input vector at said reconstruction step is said approximate input vector.

3. The method of claim 2 wherein said first and second decimating matrices are vector filters of (1 2 1) and (0-1 2-1), respectively.

4. The method of claim 1 wherein said step of decomposing said input vector includes performing Cholesky decomposition on a square matrix of a predetermined size said square matrix being the sum of said first and second decimating matrices multiplied by its respective transpose.

5. The method of claim 4 wherein said square matrix includes (1 4 1)/6 along its diagonal.

6. A method of processing a signal for a data compression system, said method comprising the steps of:

receiving an input vector of N length by an input means of said system where N is an integer for processing including the steps of:

first preparation processing a first portion of said input vector;

forward differencing processing a second portion of said input vector to generate forward differencing processed input vector, wherein said first and second portions of said input vector are non-overlapping;

second preparation processing a first portion of said forward differencing processed input vector; and backward differencing processing a second portion of said forward differencing processed input vector to generate an approximate input vector, wherein said first and second portions of said forward differencing processed input vector are nonoverlapping;

decomposing said input vector, said decomposing step including multiplying said input vector with a first and a second decimating matrices, each decimating matrix comprising a plurality of integer matrix values, to generate a shape vector and a detail vector respectively, said first and second decimating matrices being dimensioned such that said shape vector and said detail vector each have a length of N/2;

reconstructing said input vector, said step of reconstructing including multiplying said shape vector and said detail vector by a first and a second restoring matrix respectively, to generate a reconstructed shape vector and a reconstructed detail vector;

adding said reconstructed shape vector to said reconstructed detail vector to generate an integer processed input vector; and outputting compressed data using said integer processed input vector.

7. The method of claim 6 wherein said first and second decimating matrices are vector filters of (1 2 1) and (0-1 2-1), respectively.

8. An apparatus for signal processing for a data compression system, comprising:

decomposition processing means for multiplying an input vector of length N, received by an input means of said system, with a first and a second decimating matrices, each decimating matrix comprising a plurality of integer matrix values to generate a shape vector and a detail vector respectively, said first and second decimating matrices being dimensioned such that said shape vector and said detail vector each have a length of N/2;

reconstruction processing means for multiplying said shape vector and said detail vector from said decomposition means by a first and a second restoring matrix respectively, to generate a reconstructed shape vector and a reconstructed detail vector;

means for adding said reconstructed shape vector to said reconstructed detail vector to generate an integer processed input vector; and means for outputting compressed data using said integer processed input vector.

9. The apparatus of claim 8 wherein said decomposition processing means further comprises:

first preparation processing means for preparation processing a first portion of said input vector;

forward differencing processing means for forward differencing processing a second portion of said input vector to generate forward differencing processed input vector, wherein said first and second portions of said input vector are non-overlapping;

second preparation processing means for preparation processing a first portion of said forward differencing processed input vector; and backward differencing processing means for backward differencing processing a second portion of said forward differencing processed input vector to generate an approximate input vector, wherein said first and second portions of said forward differencing processed input vector are nonoverlapping.

10. The apparatus of claim 9 wherein said first and second decimating matrices are vector filters of (1 2 1) and (0-1 2-1), respectively.

* * * * *